United States Patent
Rapior

(10) Patent No.: US 11,028,756 B2
(45) Date of Patent: Jun. 8, 2021

(54) THERMAL SYSTEM WITH RANKINE CIRCUIT

(71) Applicant: FAURECIA SYSTEMES D'ECHAPPEMENT, Belfort (FR)

(72) Inventor: Julien Rapior, Belfort (FR)

(73) Assignee: FAURECIA SYSTEMES D'ECHAPPEMENT

( * ) Notice: Subject to any disclaimer, the term of this patent is extended or adjusted under 35 U.S.C. 154(b) by 36 days.

(21) Appl. No.: 16/535,531

(22) Filed: Aug. 8, 2019

(65) Prior Publication Data

US 2020/0049052 A1 Feb. 13, 2020

(30) Foreign Application Priority Data

Aug. 9, 2018 (FR) ...................................... 18 57410

(51) Int. Cl.
| | |
|---|---|
| *F01N 5/02* | (2006.01) |
| *F02G 5/02* | (2006.01) |
| *F16K 11/10* | (2006.01) |
| *F24F 11/72* | (2018.01) |
| *F01K 1/16* | (2006.01) |

(52) U.S. Cl.
CPC ................ *F01N 5/02* (2013.01); *F02G 5/02* (2013.01); *F16K 11/105* (2013.01); *F01K 1/16* (2013.01); *F24F 11/72* (2018.01)

(58) Field of Classification Search
CPC .. F01N 5/02; F02G 5/02; F16K 11/105; F24F 11/72; F01K 1/16; F01K 9/003
USPC .................................................. 60/320, 670
See application file for complete search history.

(56) References Cited

U.S. PATENT DOCUMENTS

| | | | | |
|---|---|---|---|---|
| 4,576,005 A | * | 3/1986 | Force ...................... | E21B 43/34 60/618 |
| 4,986,225 A | * | 1/1991 | Wu ......................... | F02B 29/00 123/184.54 |
| 5,351,487 A | * | 10/1994 | Abdelmalek ............. | F02G 5/00 60/618 |
| 5,688,327 A | * | 11/1997 | Swain ................... | B05C 13/025 118/500 |

(Continued)

FOREIGN PATENT DOCUMENTS

| | | | | |
|---|---|---|---|---|
| DE | 102013211875 A1 | * | 1/2015 | ............... F02G 5/02 |
| DE | 102015215063 A1 | | 2/2017 | |

(Continued)

OTHER PUBLICATIONS

International Search Report for French Application No. 1857410 dated Feb. 19, 2019.

*Primary Examiner* — Thai Ba Trieu
(74) *Attorney, Agent, or Firm* — Carlson, Gaskey & Olds, P.C.

(57) ABSTRACT

A thermal system includes a Rankine cycle heat recovery device including a Rankine circuit having a first heat exchanger, an expander, a condenser, and a first pump. A cooling device having a cooling circuit that includes a second heat exchanger, a second pump, and a third heat exchanger with a device to be cooled. The thermal system comprises a device for regulating the pressure in the Rankine circuit and includes an enclosure delimiting a space and housing a movable part separating the space into first and second chambers. The first chamber communicates with the Rankine circuit and the second chamber communicates with the cooling circuit.

12 Claims, 3 Drawing Sheets

(56) References Cited

U.S. PATENT DOCUMENTS

| | | | | |
|---|---|---|---|---|
| 6,651,433 | B1* | 11/2003 | George, Jr. | F02G 5/00 |
| | | | | 60/618 |
| 8,628,025 | B2* | 1/2014 | Bucknell | F01N 5/02 |
| | | | | 60/618 |
| 8,800,280 | B2* | 8/2014 | Harif | F01K 13/00 |
| | | | | 60/515 |
| 8,809,656 | B2* | 8/2014 | Radosevich | G10D 13/02 |
| | | | | 84/413 |
| 9,777,602 | B2* | 10/2017 | Juchymenko | F01K 25/10 |
| 2007/0163260 | A1 | 7/2007 | Hargreaves et al. | |
| 2012/0210713 | A1* | 8/2012 | Ernst | F01N 5/02 |
| | | | | 60/615 |
| 2012/0227404 | A1 | 9/2012 | Schuster et al. | |
| 2013/0067910 | A1* | 3/2013 | Ishiguro | F02G 5/00 |
| | | | | 60/597 |
| 2013/0091884 | A1 | 4/2013 | Hunt et al. | |
| 2013/0327041 | A1* | 12/2013 | Gaertner | F02G 5/02 |
| | | | | 60/645 |
| 2014/0165562 | A1* | 6/2014 | Nagai | F01K 23/101 |
| | | | | 60/615 |
| 2015/0300210 | A1* | 10/2015 | Smague | F01K 25/08 |
| | | | | 60/645 |
| 2016/0017760 | A1 | 1/2016 | Okaichi et al. | |
| 2016/0061055 | A1* | 3/2016 | Bowan | F01D 15/10 |
| | | | | 290/40 B |
| 2017/0275190 | A1 | 9/2017 | Eziyi | |
| 2018/0187573 | A1* | 7/2018 | Gutscher | F01K 17/005 |
| 2018/0283222 | A1 | 10/2018 | Park et al. | |

FOREIGN PATENT DOCUMENTS

| | | |
|---|---|---|
| JP | 2016029278 A | 3/2016 |
| JP | 2017110551 A | 6/2017 |
| KR | 101868273 B1 | 6/2018 |

\* cited by examiner

THERMAL SYSTEM WITH RANKINE CIRCUIT

CROSS-REFERENCE TO RELATED APPLICATIONS

This application is a U.S. non-provisional application claiming the benefit of French Application No. 18 57410, filed on Aug. 9, 2018, which is incorporated herein by its entirety.

TECHNICAL FIELD

The present invention relates to a thermal system, in particular for a motor vehicle.

BACKGROUND

Standard internal combustion engines have a low performance. Indeed, only 20 to 30% of the energy from the fuel is converted into mechanical energy, while the rest is dissipated into the environment in the form of heat energy, this energy loss being dissipated in the exhaust gases and in a cooling device of the vehicle.

In order to recover part of this energy, a thermal system already exists in the state of the art comprising a Rankine cycle heat recovery device including a Rankine circuit, in which a working fluid (called Rankine fluid) circulates, the circuit including a first heat exchanger in which the Rankine fluid recovers heat from a heat source, an expander, a condenser, and a first pump.

Such a heat recovery device with Rankine cycle makes it possible to convert the heat energy into mechanical or electrical energy.

The first pump makes it possible to compress and circulate the Rankine fluid. This Rankine fluid enters the first heat exchanger, in which the heat from the exhaust gases or the cooling device is used to evaporate the Rankine fluid. This high-pressure vapor passes through an expander, where it is expanded into low-pressure vapor. This expander can be a volumetric expander, such as a piston or a spiral, or a dynamic expander, like a turbine. This expander produces mechanical energy and this mechanical energy can be converted into electricity using an electrical generator. The low-pressure vapor is next cooled and condensed in the condenser.

It should be noted that the Rankine fluid can be subject to pressure variations between the expander and the pump, which may in some cases cause cavitation of the pump.

SUMMARY OF THE INVENTION

A thermal system is provided in which the pressure between the expander and the pump of the Rankine cycle heat recovery device is regulated automatically, without requiring a regulating valve.

To that end, a thermal system is provided, in particular for a motor vehicle, of the type including:
- a Rankine cycle heat recovery device including a Rankine circuit, in which a Rankine fluid circulates, the Rankine circuit including a first heat exchanger in which the Rankine fluid recovers heat from a heat source, an expander, a condenser, and a first pump,
- a cooling device including a cooling circuit in which a refrigerant circulates, the cooling circuit including a second heat exchanger in which the refrigerant gives heat to a cold source, a second pump, and a third heat exchanger with a device to be cooled, the thermal system comprising a device for regulating the pressure in the Rankine circuit, this pressure regulating device including an enclosure delimiting a space and housing a movable part separating the space into first and second chambers, the first chamber communicating with the Rankine circuit and the second chamber communicating with the cooling circuit.

The pressure regulating device is an additional device, therefore separate from the expander of the Rankine circuit and separate from the second pump.

The pressure in the cooling device is used to control the pressure between the expander and the pump of the Rankine cycle heat recovery device.

A thermal system can further include one or several of the following features, considered alone or according to all technically possible combinations:
- the pressure regulating device comprises:
  - an inlet for Rankine fluid in gaseous form into the first chamber and an outlet for Rankine fluid in liquid form from the first chamber,
  - an inlet pipe for refrigerant in the second chamber and an outlet pipe for refrigerant from the second chamber, and
  - the condenser, formed by a heat exchange pipe extending in the first chamber and in which the refrigerant circulates.
- the thermal system comprises a valve, and in particular a three-way valve, one channel of which is connected to the second chamber and another channel of which is connected to the heat exchange pipe of the condenser.
- the pressure regulating device is separate from the condenser, the first chamber of the pressure regulating device communicating with the Rankine circuit between the condenser and the first pump.
- the second chamber is connected to the cooling circuit via a valve, the valve preferably being a three-way valve arranged in parallel with the second pump, including a first channel connected to the second chamber, a second channel connected upstream from the second pump and a third channel connected downstream from the second pump.
- the movable part of the pressure regulating device is chosen from among a membrane, a piston, or a bladder.
- the device to be cooled is a heat engine, the heat source being formed by an exhaust gas coming from this heat engine.
- the cooling circuit comprises an expansion tank.

The invention also relates to an exhaust line, in particular of a motor vehicle, comprising a thermal system as previously described.

The invention also relates to a vehicle, in particular a motor vehicle, comprising an exhaust line as previously described.

BRIEF DESCRIPTION OF DRAWINGS

The invention will be better understood upon reading the following description, provided solely as an example and done in reference to the appended figures, in which.

DETAILED DESCRIPTION OF PREFERRED EMBODIMENTS

Figure 1:
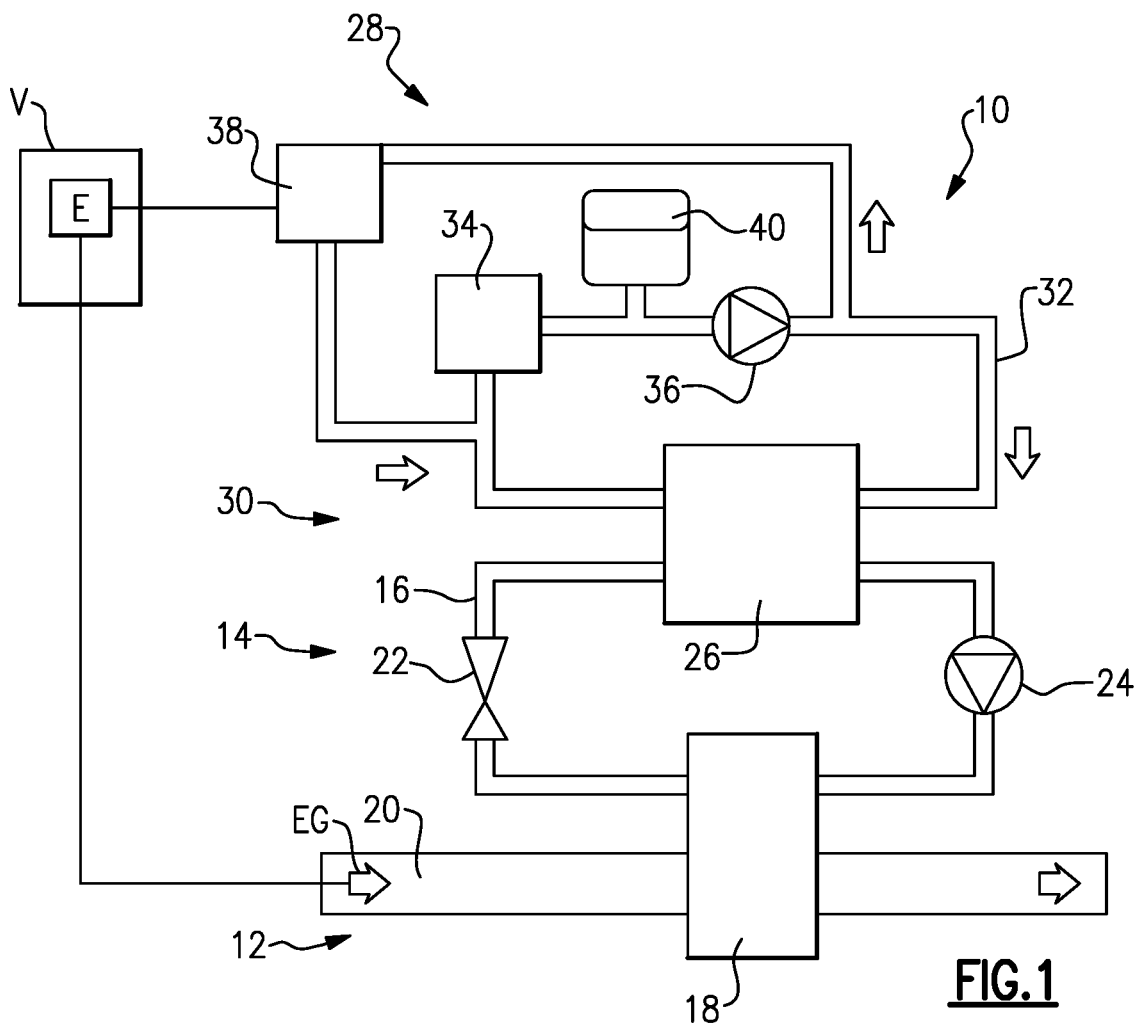
FIG. 1 is a schematic view of a thermal system according to a first exemplary embodiment of the invention.

FIG. 1 shows a thermal system 10, in particular intended to equip a motor vehicle V.

The thermal system 10 comprises a Rankine cycle heat recovery device 12 including a Rankine circuit 14, in which a Rankine fluid 16 circulates, the Rankine circuit 14 including a first heat exchanger 18 in which the Rankine fluid 16 recovers heat from a heat source 20, an expander 22, a condenser 23 and a first pump 24.

For example, the heat source 20 is an exhaust gas EG.

Figure 2:
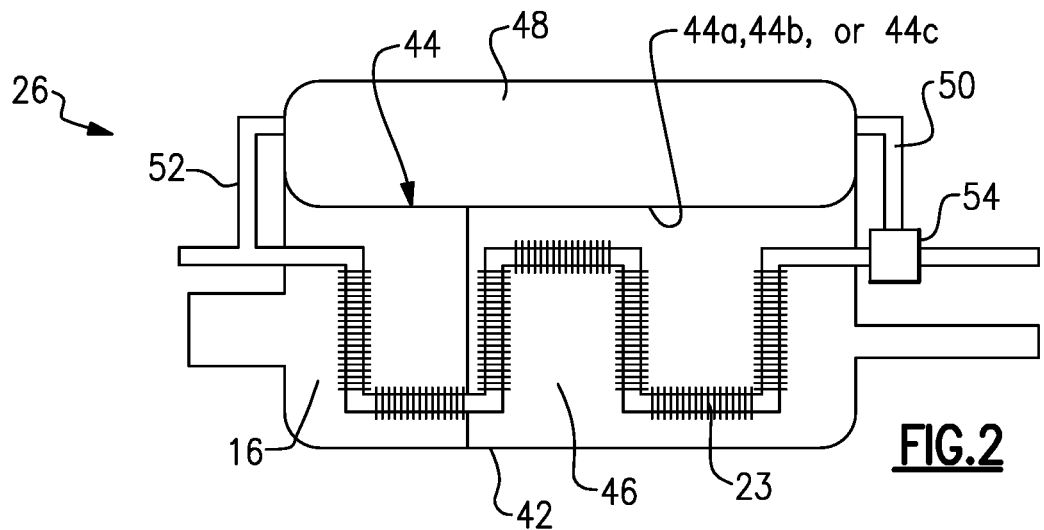
FIG. 2 is a schematic view of a pressure regulating device equipping the thermal system of FIG. 1.

According to this first embodiment, the condenser 23 is included in a device 26 for regulating the pressure, shown in detail in FIG. 2. This device 26 for regulating the pressure is arranged downstream from the expander 22 and upstream from the first pump 24, in other words in a low-pressure part of the Rankine circuit 14.

The thermal system 10 also comprises a cooling device 28 including a cooling circuit 30, in which a refrigerant 32 circulates. The cooling circuit 30 includes a second heat exchanger 34 in which the refrigerant 32 gives heat to a cold source, a second pump 36, and a third heat exchanger 38 with a device to be cooled, the device to be cooled, for example, being an engine E of the motor vehicle V.

The cooling circuit 30 also conventionally includes an expansion tank 40.

Advantageously, the expansion tank 40 meets the following operating conditions:
  a pressure of between 1.2 and 2.2 bars, for example between 1.3 and 2 bars, and preferably between 1.4 and 1.7 bars,
  a temperature of between 45 and 100° C., for example between 55 and 90° C., and preferably between 65 and 80° C.

Under these operating conditions, the Rankine fluid 16 is ethanol.

As previously indicated, the thermal system 10 according to the invention comprises the device 26 for regulating the pressure in the Rankine circuit 14, shown in more detail in FIG. 2.

The pressure regulating device 26 includes an enclosure 42 delimiting a space, and housing a movable part 44 separating the space into first 46 and second 48 chambers. The first chamber 46 communicates with the Rankine circuit 14, and it is therefore filled with Rankine fluid 16, and the second chamber 48 communicates with the cooling circuit 30, and it is therefore filled with refrigerant 32.

According to this embodiment, the first chamber 46 houses the condenser 23, which is formed by a heat exchange pipe, preferably provided with fins, and in which the refrigerant 32 circulates.

Owing to the pressure regulating device 26, the pressure is transmitted to the Rankine fluid 16 by the movable part 44 that separates the Rankine fluid 16 from the refrigerant 32.

It will be noted that the movable part 44 can be formed by a membrane 44a, a bladder 44b, or in a variant by a piston 44c as shown in FIG. 2.

The pressure in the pressure regulating device 26 is the same as that in the expansion tank 40 of the cooling circuit 30. This pressure depends on the thermal expansion of the refrigerant 32, therefore its temperature.

It should be noted that the saturation pressure upstream from the first pump 24 is lower than the pressure in the expansion tank 40.

According to the embodiment shown in FIG. 2, the pressure regulating device 26 comprises an inlet pipe 50 for refrigerant 32 and an outlet pipe 52 for refrigerant 32, connected to the cooling circuit 30 and emerging on either side of the second chamber 48. Thus, the refrigerant 32 can circulate in the second chamber 48, which prevents overheating of this refrigerant 32 due to its proximity with the Rankine fluid 16 in the pressure regulating device 26.

Advantageously, the inlet pipe 50 is connected to the cooling circuit 30 via a valve 54, making it possible to control the flow rate of refrigerant 32 through the second chamber 48.

The valve 54 is, for example, a three-way valve comprising a first path connected to the cooling circuit 30, a second path connected to the second chamber 48 and more specifically to the refrigerant 32 inlet pipe 50 into the second chamber 48, and a third path connected to the heat exchange pipe of the condenser 23. Thus, the valve 54 also makes it possible to control the flow of refrigerant 32 through the condenser 23, in order to control the temperature of the Rankine fluid 16 leaving this condenser 23, therefore at the inlet of the first pump 24.

The operation of the thermal system 10 according to the first embodiment will now be described.

The Rankine fluid 16 takes heat in the first exchanger 18, then is expanded in the expander 22, before arriving in gaseous form in the first chamber 46, where it is condensed in liquid form before leaving the first chamber 46 toward the first pump 24.

In the cooling circuit 30, the refrigerant 32, driven by the second pump 36, recovers calories from the third heat exchanger 38, to restore them to the second heat exchanger 34, conventionally.

Part of the refrigerant 32 is, however, deflected toward the pressure regulating device 26, and more specifically toward the condenser 23 and toward the second chamber 48. The flow rate of this refrigerant portion 32 is regulated by the valve 54.

The pressure of the refrigerant 32 is transmitted to the Rankine fluid 16 by the movable part 44, thus compensating the volume variations of the Rankine fluid 16.

The refrigerant 32 leaving the pressure regulating device 26 next enters the second heat exchanger 34, where it is cooled.

Figure 3:
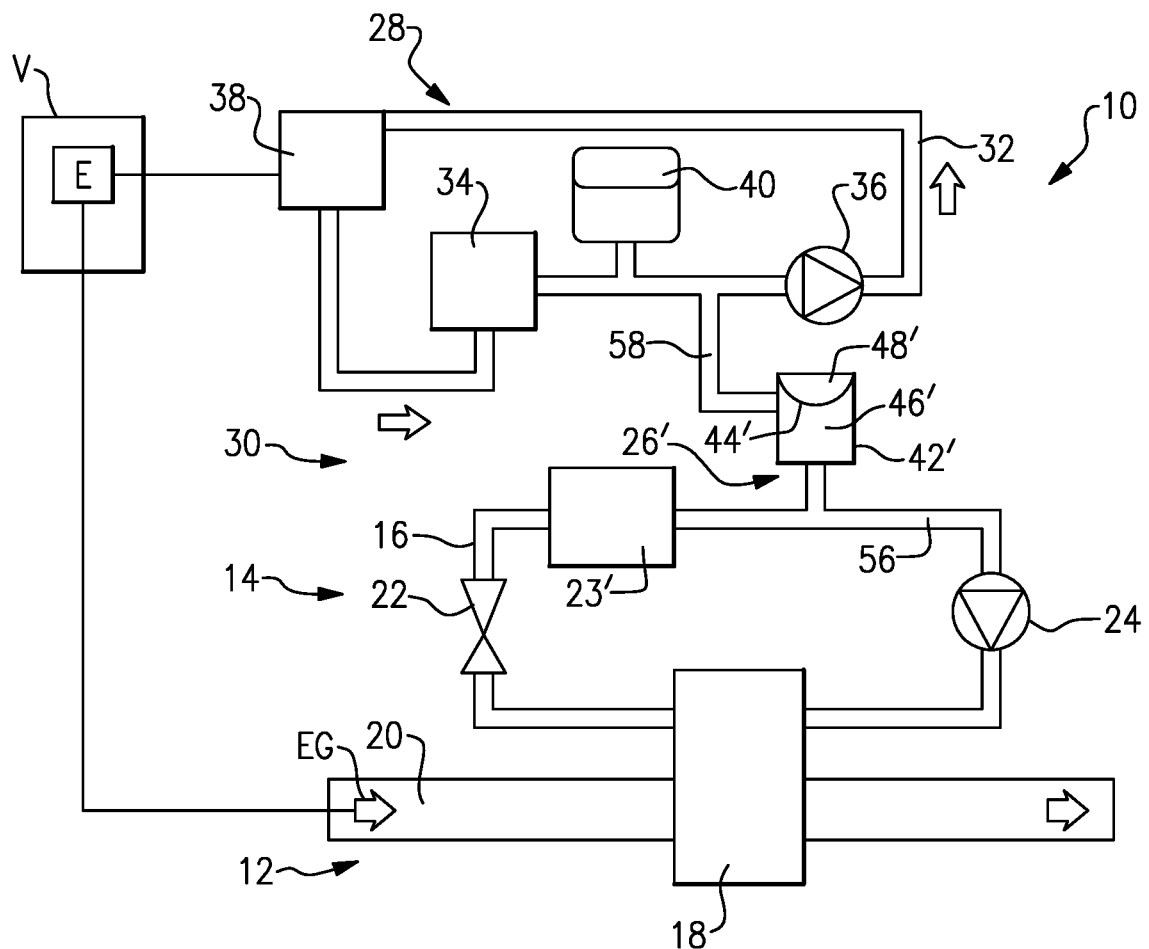
FIG. 3 is a schematic view of a thermal system according to a second exemplary embodiment of the invention.

FIG. 3 shows a thermal system 10 according to a second exemplary embodiment of the invention. In this figure, the elements similar to those of the two preceding figures are designated using identical references, and will not be described again.

The thermal system 10 according to this second embodiment differs from that of the first embodiment in that the condenser 23' and the pressure regulating device 26' are separate.

The condenser 23' is then arranged downstream from the expander 22 and upstream from the pressure regulating device 26'.

The pressure regulating device 26' includes an enclosure 42' delimiting a space, and housing a movable part 44' separating the space into first 46' and second 48' chambers. The movable part 44' is, for example, a membrane, a piston or a bladder.

The first chamber 46' communicates with the Rankine circuit 14, and more specifically with a first branch 56 connecting the condenser 23' to the first pump 24.

The second chamber 48' communicates with the cooling circuit 30, and more specifically with a second branch 58 connecting the second heat exchanger 34 to the second pump 36.

The operation of the pressure regulation in the Rankine circuit 14 is similar to that previously described for the first embodiment.

Figure 4:
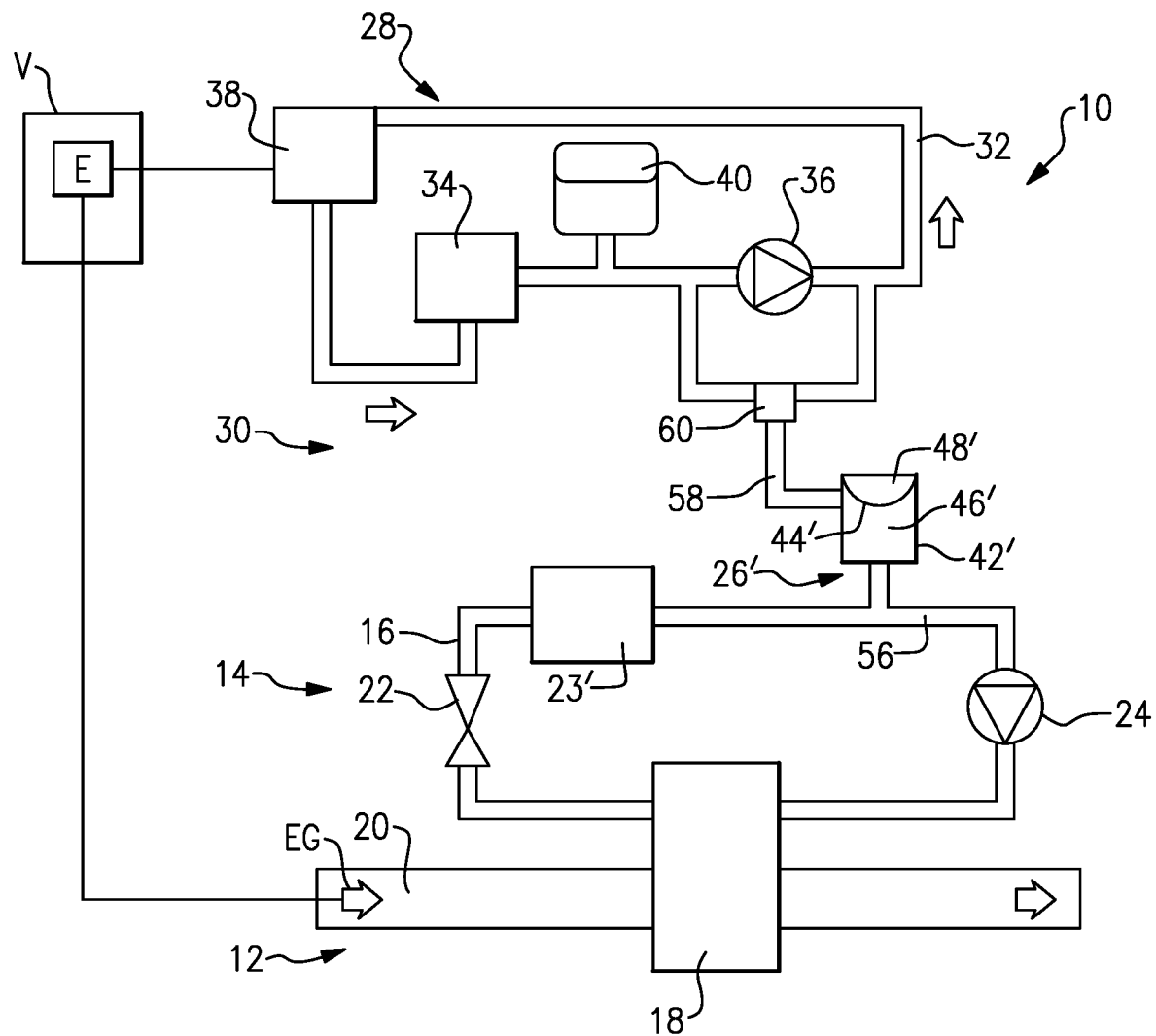
FIG. 4 is a schematic view of a thermal system according to a third exemplary embodiment of the invention.

FIG. 4 shows a thermal system 10 according to a third exemplary embodiment of the invention. In this figure, the elements similar to those of the two preceding figures are designated using identical references, and will not be described again.

The thermal system 10 according to this third embodiment differs from that of the second embodiment in that the second chamber 48' is connected to the cooling circuit 30 via a valve 60.

More specifically, the valve 60 is a three-way valve arranged in parallel with the second pump 36, including a first channel connected to the second chamber 48', a second channel connected upstream from the second pump 36, and a third channel connected downstream from the second pump 36.

The operation of the pressure regulation in the Rankine circuit 14 is similar to that previously described for the second embodiment, with the exception of the fact that, owing to the valve 60, the second chamber 48' can be connected to the cooling circuit 30 upstream or downstream from the second pump 36, depending on the desired pressure.

It will be noted that the invention is not limited to the embodiments previously described, but could take the form of various variants.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A thermal system for a motor vehicle including:
   a Rankine cycle heat recovery device including a Rankine circuit, in which a Rankine fluid circulates, the Rankine circuit including a first heat exchanger in which the Rankine fluid recovers heat from a heat source, an expander, a condenser, and a first pumps;
   a cooling device including a cooling circuit in which a refrigerant circulates, the cooling circuit including a second heat exchanger in which the refrigerant gives heat to a cold source, a second pump, and a third heat exchanger with a device to be cooled; and
   a pressure regulating device that regulates the pressure in the Rankine circuit, the pressure regulating device including an enclosure delimiting a space and housing a movable part separating the space into first and second chambers, the first chamber communicating with the Rankine circuit and the second chamber communicating with the cooling circuit;
      wherein the pressure regulating device is positioned downstream of the expander in the Rankine circuit.

2. The thermal system according to claim 1, wherein the pressure regulating device is separate from the condenser, the first chamber of the pressure regulating device communicating with the Rankine circuit between the condenser and the first pump.

3. The thermal system according to claim 2, wherein the second chamber is connected to the cooling circuit via a valve.

4. The thermal system according to claim 1, wherein the movable part of the pressure regulating device is chosen from among a membrane, a piston, or a bladder.

5. The thermal system according to claim 1, wherein the device to be cooled is a heat engine, the heat source being formed by an exhaust gas coming from the heat engine.

6. The thermal system according to claim 1, wherein the cooling circuit comprises an expansion tank.

7. The thermal system according to claim 1, wherein the condenser and the pressure regulating device are separate, and wherein the condenser is arranged downstream from the expander and upstream from the pressure regulating device.

8. The thermal system according to claim 1, wherein the condenser is included in the pressure regulating device, and wherein the pressure regulating device is arranged downstream from the expander and upstream from the first pump.

9. A thermal system for a motor vehicle including:
   a Rankine cycle heat recovery device including a Rankine circuit, in which a Rankine fluid circulates, the Rankine circuit including a first heat exchanger in which the Rankine fluid recovers heat from a heat source, an expander, a condenser, and a first pump;
   a cooling device including a cooling circuit in which a refrigerant circulates, the cooling circuit including a second heat exchanger in which the refrigerant gives heat to a cold source, a second pump, and a third heat exchanger with a device to be cooled;
   a pressure regulating device that regulates the pressure in the Rankine circuit, the pressure regulating device including an enclosure delimiting a space and housing a movable part separating the space into first and second chambers, the first chamber communicating with the Rankine circuit and the second chamber communicating with the cooling circuit;
   wherein the pressure regulating device comprises:
      an inlet for Rankine fluid in gaseous form into the first chamber and an outlet for Rankine fluid in liquid form from the first chamber;
      an inlet pipe for refrigerant in the second chamber and an outlet pipe for refrigerant from the second chamber; and
      the condenser, formed by a heat exchange pipe extending in the first chamber and in which the refrigerant circulates.

10. The thermal system according to claim 9, comprising a valve, one channel of which is connected to the second chamber and another channel of which is connected to the heat exchange pipe of the condenser.

11. A thermal system for a motor vehicle having a Rankine cycle heat recovery device including:
   a Rankine circuit, in which a Rankine fluid circulates, the Rankine circuit including a first heat exchanger in which the Rankine fluid recovers heat from a heat source, an expander, a condenser, and a first pump;
   a cooling device including a cooling circuit in which a refrigerant circulates, the cooling circuit including a second heat exchanger in which the refrigerant gives heat to a cold source, a second pump, and a third heat exchanger with a device to be cooled; and
   a pressure regulating device that regulates the pressure in the Rankine circuit, the pressure regulating device including an enclosure delimiting a space and housing a movable part separating the space into first and second chambers, the first chamber communicating with the Rankine circuit and the second chamber communicating with the cooling circuit;

wherein the pressure regulating device is separate from the condenser, the first chamber of the pressure regulating device communicating with the Rankine circuit between the condenser and the first pump;

wherein the second chamber is connected to the cooling circuit via a valve; and wherein the valve is a three-way valve arranged in parallel with the second pump, including a first channel connected to the second chamber, a second channel connected upstream from the second pump and a third channel connected downstream from the second pump.

12. The thermal system according to claim 10, wherein the valve comprises a three-way valve.

* * * * *